(12) United States Patent
Irie et al.

(10) Patent No.: US 10,258,067 B2
(45) Date of Patent: Apr. 16, 2019

(54) PRODUCTION METHOD FOR FROZEN NOODLES AND COMPOSITION FOR PREVENTING FREEZER BURN

(71) Applicant: NISSHIN FOODS, INC., Chiyoda-ku (JP)

(72) Inventors: Kentarou Irie, Fujimino (JP); Youhei Suga, Fujimino (JP); Norio Koizumi, Fujimino (JP); Takenori Watanabe, Fujimino (JP); Youichirou Miya, Fujimino (JP); Tsuguhiko Yoshida, Chiyoda-ku (JP)

(73) Assignee: NISSHIN FOODS INC., Chiyoda-ku (JP)

( * ) Notice: Subject to any disclaimer, the term of this patent is extended or adjusted under 35 U.S.C. 154(b) by 761 days.

(21) Appl. No.: 14/391,965

(22) PCT Filed: Apr. 5, 2013

(86) PCT No.: PCT/JP2013/060499
§ 371 (c)(1),
(2) Date: Oct. 10, 2014

(87) PCT Pub. No.: WO2013/172118
PCT Pub. Date: Nov. 21, 2013

(65) Prior Publication Data
US 2015/0140192 A1    May 21, 2015

(30) Foreign Application Priority Data

May 15, 2012  (JP) .................................. 2012-111539
May 31, 2012  (CN) .......................... 2012 1 0175668

(51) Int. Cl.
| A23L 7/109 | (2016.01) |
| A23L 3/37 | (2006.01) |
| A23L 29/238 | (2016.01) |
| A23L 29/269 | (2016.01) |

(52) U.S. Cl.
CPC .............. *A23L 3/37* (2013.01); *A23L 7/111* (2016.08); *A23L 29/238* (2016.08); *A23L 29/27* (2016.08); *A23V 2002/00* (2013.01)

(58) Field of Classification Search
CPC ...... A23V 2002/00; A23L 29/27; A23L 7/111; A23L 3/37; A23L 29/238
USPC ......................................................... 426/557
See application file for complete search history.

(56) References Cited

U.S. PATENT DOCUMENTS

| 4,556,568 A | * | 12/1985 | Meyer ................ A23L 27/40 |
| | | | 426/302 |
| 6,235,330 B1 | * | 5/2001 | Scherpf .................. A23P 20/18 |
| | | | 426/100 |

| 2004/0058037 A1 | 3/2004 | Masuda et al. |
| 2004/0253349 A1 | 12/2004 | Kato et al. |
| 2010/0189846 A1 | 7/2010 | Irie |

FOREIGN PATENT DOCUMENTS

| CN | 101513201 A | 8/2009 |
| CN | 101848651 A | 9/2010 |
| EP | 2 201 847 A1 | 6/2010 |
| EP | 2 850 951 A1 | 3/2015 |
| JP | 7-99907 A | 4/1995 |
| JP | 2001128632 A * | 5/2001 |
| JP | 2003-135013 | 5/2003 |
| JP | 2007-174920 | 7/2007 |
| JP | 2010-246466 | 11/2010 |
| JP | 2013-34445 | 2/2013 |
| RU | 2 274 244 C2 | 4/2006 |
| WO | 2003-022079 | 3/2003 |
| WO | 2009-054100 | 4/2009 |

OTHER PUBLICATIONS

Combined Chinese Office Action and Search Report dated Sep. 25, 2015 in Patent Application No. 201380025262.7 (with English Translation of Category of Cited Documents).
Wang Yuan-Ian et al., "Rheology Study on Low Concentration Cold Water and Hot Water Dissolving Parts of Xanthan gum", Food Science, vol. 28, No. 6, 2007, 5 pages (with English Abstract and Partial English Translation).
Combined Office Action and Search Report dated Nov. 4, 2015 in Chinese Patent Application No. 201380025312.1 with English translation of category of cited documents.
Extended European Search Report dated Jun. 22, 2015 in Patent Application No. 13790765.5.
U.S. Appl. No. 14/389,943, filed Oct. 1, 2014, Irie, et al.
Taneichi Kawasaki, "Ryudo Shokuhin no Nendo Data", New Food Industry, 1981, vol. 23, No. 1, Total 5 pages.
Written Opinion of the International Searching Authority dated Jun. 25, 2013 in PCT/JP2013/060499 filed Apr. 5, 2013.
International Search Report dated Jun. 25, 2013 in PCT/JP2013/060499 filed Apr. 5, 2013.
Russian Office Action dated Jan. 13, 2017 in Patent Application No. 2014150567 (with English Translation).

* cited by examiner

*Primary Examiner* — Jyoti Chawla

(74) *Attorney, Agent, or Firm* — Oblon, McClelland, Maier & Neustadt, L.L.P.

(57) ABSTRACT

Provided is frozen noodles in which freezer burn is unlikely to occur. A method for producing frozen noodles comprises: a step of attaching a composition to cooked noodles, the composition comprising at least water, oil or fat and a polysaccharide thickener, and having a viscosity of from 30 to 2000 mPa·s at 60° C.; and a step of freezing the noodles to which the composition has attached.

20 Claims, No Drawings

PRODUCTION METHOD FOR FROZEN NOODLES AND COMPOSITION FOR PREVENTING FREEZER BURN

CROSS REFERENCE TO RELATED APPLICATIONS

The present application is a 35 U.S.C. § 371 national stage application of International patent application PCT/JP2013/060499, filed on Apr. 5, 2013, published as WO/2013/172118 on Nov. 21, 2013, the text of which is incorporated by reference, and claims the benefit of the filing date of Japanese application no.2012-111539, filed on May 15, 2012, and Chinese application no. 2012101755668.0, filed on May 31, 2012, the text of both of which is also incorporated by reference.

TECHNICAL FIELD

The present invention relates to a method for producing frozen noodles and use of a composition for preventing freezer burn of frozen noodles.

BACKGROUND ART

In general, when frozen food is stored in a frozen state for a long period of time, a discoloring phenomenon in which the original color of the food is partially or wholly lost to be, for example, whitish, namely, what is called freezer burn, may sometimes occur, and this phenomenon lowers the commercial value in both the appearance and the texture.

As a method for preventing freezer burn of frozen food, Patent Literature 1 proposes a method for preventing freezer burn of frozen noodles comprising attaching a coating liquid containing at least water, common salt, oil or fat and a thickener to cooked noodles and freezing the noodles.

Patent Literature 2 describes a method for producing frozen noodles in which cooked noodles are coated with an emulsified oil obtained by mixing and emulsifying water, oil or fat, a protein and/or a hydrolysate thereof, and a polysaccharide thickener; the noodles are formed and frozen so that the frozen noodle mass may have a recessed part at the center thereof; water or an aqueous liquid is attached to the surface of the noodles during or after the freezing; and the resulting noodles are further frozen so as to form a frozen layer of the water or the aqueous liquid on the surface of the noodles.

Patent Literature 3 discloses that a high-oil emulsified oil or fat composition obtained by mixing an emulsifier, a polyhydric alcohol, water, and oil or fat under a specific condition is attached to cooked noodles, followed by freezing.

Besides, as a method for preventing freezer burn of frozen fried food, Patent Literature 4 proposes a method in which a thickener having properties of hardly dissolving in cold water and easily dissolving in hot water is contained in a coating mix. Patent Literature 5 describes a method for producing a frozen food in which a food is frozen after bringing an oil or fat containing an emulsifier into contact with the food.

There is, however, a demand for further means for more effectively preventing freezer burn of frozen noodles. Besides, there is a demand for means for giving favorable taste and flavor of oil or fat to frozen noodles while preventing freezer burn.

CITATION LIST

Patent Literature

[Patent Literature 1]
  International Publication No. WO2009/054100
[Patent Literature 2]
  JP-A-2007-174920
[Patent Literature 3]
  JP-A-2010-246466
[Patent Literature 4]
  JP-A-2003-135013
[Patent Literature 5]
  International Publication No. WO2003/022079

SUMMARY OF INVENTION

Technical Problem

It is an object of the present invention to easily and efficiently provide frozen noodles in which freezer burn is unlikely to occur.

Solution to Problem

As a result of making various studies to achieve the aforementioned object, the present inventors found that freezer burn of cooked noodles can be effectively prevented and pleasant flavor of oil or fat can be given to the noodles by attaching, to cooked noodles, a composition comprising at least water, oil or fat and a polysaccharide thickener and having a specific viscosity, and subsequently freezing the noodles to which the composition has attached, and thus accomplished the present invention.

Specifically, the present invention provides a method for producing frozen noodles comprising: a step of attaching, to cooked noodles, a composition comprising at least water, oil or fat and a polysaccharide thickener and having a viscosity of from 30 to 2000 mPa·s at 60° C.; and a step of freezing the noodles to which the composition has attached.

Furthermore, the present invention provides a method for preventing freezer burn of frozen noodles comprising: a step of attaching, to cooked noodles, a composition comprising at least water, oil or fat and a polysaccharide thickener and having a viscosity of from 30 to 2000 mPa·s at 60° C.; and a step of freezing the noodles to which the composition has attached.

Besides, the present invention provides use of a composition for preventing freezer burn of frozen noodles, the composition comprising at least water, oil or fat and a polysaccharide thickener and having a viscosity of from 30 to 2000 mPa·s at 60° C.

In addition, the present invention provides a freezer burn inhibitor for frozen noodles comprising a composition which comprises at least water, oil or fat and a polysaccharide thickener and has a viscosity of from 30 to 2000 mPa·s at 60° C.

Advantageous Effect of Invention

According to the present invention, frozen noodles in which freezer burn is unlikely to occur can be easily and efficiently provided.

DESCRIPTION OF EMBODIMENT

Herein, freezer burn of frozen noodles refers to a state where the surface of noodles has dried during frozen storage, and more specifically refers to that noodles are thinned, the surface of the noodles is discolored or the noodles are hardened because water contained in the surface portion of the noodles has evaporated or migrated to another portion.

According to the present invention, the freezer burn occurring when cooked noodles are frozen can be prevented by attaching, to the surface of the noodles, a composition which comprises at least water, oil or fat and a polysaccharide thickener and has a viscosity of from 30 to 2000 mPa·s at 60° C.

The content of water in the composition may be from 60 to 76.9% by mass, and is preferably from 65 to 72% by mass. If the content is lower than 60% by mass, the quality of the cooked noodles is lowered because of sticky texture, and on the other hand, if the content exceeds 76.9% by mass, the composition becomes watery and taste and flavor peculiar to the oil or fat is reduced, resulting in degrading the quality of the cooked noodles.

As the oil or fat contained in the composition, any of vegetable and animal food oils or fats generally used for food may be used, and examples include soybean oil, margarine, shortening, butter, olive oil, cacao butter, palm oil, palm kernel oil, coconut oil, corn oil, cotton oil, rapeseed oil, sunflower oil, tallow, lard, milk fat and fish oil, among which soybean oil and margarine are preferred especially from the viewpoint of improvement of taste and flavor. The oils or fats may be used singly or in a mixture of two or more. The content of the oil or fat in the composition may be from 23 to 39.9% by mass, and is preferably from 27 to 36% by mass. If the content is lower than 23% by mass, the taste and flavor peculiar to the oil or fat are insufficient in the noodles. On the other hand, if the content exceeds 39.9% by mass, the taste and flavor of the oil or fat are too strong and oily feeling of the noodles is enhanced, and hence the quality of the noodles is degraded.

As the polysaccharide thickener contained in the composition, any of polysaccharide thickeners generally used for food may be used, and examples include water-soluble or poorly water-soluble polysaccharide thickeners such as xanthan gum, tamarind gum, guar gum, curdlan, carrageenan, agar, locust bean gum, hyaluronic acid, pectin, alginic acid, cellulose and methyl cellulose. Among these, water-soluble polysaccharide thickeners are preferred from the viewpoint of improvement of dispersibility and improvement of taste and flavor, and xanthan gum and tamarind gum are more preferred. The polysaccharide thickeners may be used singly or in a mixture of two or more.

The content of the polysaccharide thickener in the composition may be from 0.1 to 1.0% by mass, and is preferably from 0.3 to 0.7% by mass. If the content is lower than 0.1% by mass, the viscosity of the composition is so low that the noodles cannot be covered with the composition, and hence a sufficient effect to prevent freezer burn cannot be attained. On the other hand, if the content exceeds 1.0% by mass, the viscosity of the composition is too high to uniformly cover the whole noodles, and furthermore, the oily feeling of the noodles is increased to spoil the mouth feel and melt-in-the-mouth texture, and hence the quality of the noodles is also degraded.

The composition may further contain, in addition to the water, the oil or fat and the polysaccharide thickener, an emulsifier, a seasoning or the like. An emulsifier is preferably added from the viewpoint of improvement of dispersion homogeneity. Examples of the emulsifier include sucrose fatty acid esters, glycerin fatty acid esters, propylene glycol fatty acid esters, sorbitan fatty acid esters, lecithin and the like. The emulsifiers may be used singly or in a mixture of two or more. Any of seasonings generally used in cooking noodles may be contained as long as the effect of the present invention is not inhibited. However, from the viewpoint of preventing an increase of a boiling point and a decrease of a freezing point of the frozen noodles, it is preferred that the composition does not contain common salt. If the composition contains common salt, the quality of the noodles may be degraded in freezing/thawing, or the taste and flavor may be degraded.

Besides, the composition has a viscosity of from 30 to 2000 mPa·s, preferably from 80 to 1000 mPa·s at 60° C. Herein, the viscosity of the composition refers to a value measured by using a rotational viscometer (a single cylindrical rotational viscometer, such as one manufactured by Tech-Jam Co., Ltd.).

The composition can be prepared, for example, by mixing the oil or fat and the polysaccharide thickener, and an emulsifier or the like if necessary, to obtain a mixture, and subsequently mixing the mixture with water. The preparation process for the composition is, however, not limited to the above as long as the oil or fat and the polysaccharide thickener can be dispersed in the whole composition, preferably substantially homogeneously. Examples of the form of the prepared composition include an aqueous solution, a suspension, a dispersion, an emulsion, a gel and the like, and the composition may be in any of these forms as long as the aforementioned viscosity and the dispersibility of the components can be maintained.

In the case where the composition is used for preventing the freezer burn of frozen noodles, the composition is preferably attached to cooked noodles before freezing in an amount of from 1 to 15% by mass, preferably from 5 to 10% by mass based on the mass of the cooked noodles. If the amount attached is less than 1% by mass, the composition cannot be sufficiently adhered to the noodles. On the other hand, if the amount exceeds 15% by mass, the oily feeling is too strong, hence the quality is degraded, and in addition, a thaw property in cooking is lowered. Besides, when a sauce or the like is further added to the frozen noodles, if the amount attached of the composition exceeds 15% by mass, the sauce or the like is thinned, and hence the quality is degraded.

Means for attaching the composition to the noodles is not especially limited as long as the composition can be attached homogeneously to the surface of noodle strands or a noodle mass. Examples of the means for attaching include submerging, smearing, spraying, blending and the like, and from the viewpoint of the operational efficiency, spraying is preferably employed.

Now, a method for producing frozen noodles of the present invention will be described.

First, noodles are produced, and the noodles are cooked by heating to obtain gelatinized cooked noodles.

The noodles are not particularly specified, and examples include pastas such as macaroni and spaghetti, Japanese thick noodles (udon), medium-thick noodles (hiyamugi), thin noodles (somen), flat-faced noodles (hiramen), Japanese buckwheat noodles (soba), Chinese noodles, rice noodles, dough wrappers (such as Chinese dumpling wrappers (gyoza), laviolis a la vapeur (shumai), spring roll (harumaki), Chinese wonton wrappers and pizza dough).

Furthermore, a method for producing the noodles is not also especially limited, and any method for producing noodles generally employed in this field, such as a rolling and extrusion at lower than 80 kgf/cm², may be employed.

Besides, as means for cooking the noodles, any means that can gelatinize noodles through a heat treatment for edible substances may be employed, and examples include boiling, steaming, frying, baking and microwave heating with a microwave oven or the like. Preferably, the noodles are cooked by heating together with water so that the yield of the noodles attained after the cooking can be about 200 to 250%.

Subsequently, to the thus obtained cooked noodles, the aforementioned composition which contains at least water, the oil or fat and the polysaccharide thickener and has a viscosity of from 30 to 2000 mPa·s at 60° C. is attached. The constituents of the composition, the amount attached and means for attaching the composition to the noodles are as described above.

For example, a composition (having a viscosity of from 30 to 2000 mPa·s at 60° C.) containing from 60 to 76.9% by mass of water, from 23 to 39.9% by mass of oil or fat, from 0.1 to 1.0% by mass of a polysaccharide thickener, and from 0.1 to 1.0% by mass of an emulsifier if necessary is attached to the cooked noodles in an amount of from 1 to 15% by mass, preferably from 5 to 10% by mass.

In attaching the composition to the cooked noodles, the food product temperature of the cooked noodles is preferably 20° C. or less, and the food product temperature of the composition to be attached is preferably from 15 to 60° C., more preferably from 20 to 45° C.

Subsequently, frozen noodles can be obtained by freezing the cooked noodles to which the composition has attached. Means for freezing the noodles may be either quick freezing or slow freezing, and quick freezing is preferred from the viewpoint of the quality maintenance of the noodles. The noodles once frozen by quick freezing can be stored under general frozen-storage condition.

Besides, to the frozen noodles obtained as described above, a sauce or the like may further be attached in addition to the attachment of the composition of the present invention, so as to make the noodle strands easily loosen or make the noodle strands easily mixed with the sauce or like when the frozen noodles are thawed. The frozen noodles having a sauce or the like attached thereto can be produced, for example, by attaching the composition to cooked noodles, and further attaching a sauce or the like thereto. Specific examples of a method for producing frozen noodles with a sauce include a method in which the composition is attached to cooked noodles, then the resultant noodles are frozen once, a sauce or the like is attached to the frozen noodles, and subsequently the resultant noodles are frozen again; and a method in which the composition is first attached to cooked noodles, a sauce or the like is subsequently attached thereto, and the resultant noodles are frozen to obtain frozen noodles. Examples of means for attaching a sauce or the like to noodles include: immersing noodle strands or a noodle mass in a sauce or the like; coating noodle strands or a noodle mass with a sauce or the like; smearing or spraying a sauce or the like onto noodle strands or a noodle mass; packing noodle strands or a noodle mass together with a sauce or the like; mixing and stirring noodle strands or a noodle mass with a sauce or the like; and sauteing noodle strands or a noodle mass with a sauce or the like.

As the sauce or the like, any of arbitrary sauces and the like may be used in accordance with the type of cooked noodles and preference of consumers. Examples of the sauce or the like include, but are not limited to, tomato-based sauces such as a meat sauce, a Neapolitan sauce and an arrabbiata sauce, a white sauce such as a carbonara sauce, oil-based sauces such as a peperoncino sauce, a brown sauce and the like for pastas such as macaroni and spaghetti; a noodle soup, a curry sauce and the like for Japanese thick noodles (udon), medium-thick noodles (hiyamugi), thin noodles (somen), Japanese buckwheat noodles (soba) and the like; and a Chinese soup, a Worcester sauce and the like for Chinese noodles, rice noodles or the like. Besides, the sauce or the like may appropriately include ingredients such as vegetables, mushrooms, meats, seafood, eggs and spices.

In order to make the freezer burn of the frozen noodles more unlikely to occur, or in order to ease the thawing process by microwave oven heating or the like, the cooked noodles to which the composition has attached may be frozen in a state where they are packed in a container, or may be packed in a container after being frozen.

The type of container is not especially limited, and examples include a container in any of arbitrary shapes such as a bag, a cup and a tray, and a container obtained by combining these shapes. The container may be further provided with a press lid, a slip lid or a pillared lid.

The material of the container may be any material generally used for a food container, and examples include polyethylene terephthalate, crystallized polyethylene terephthalate, polypropylene, polyethylene, polystyrene, and a composite material of any of these. Among these materials, one applicable to microwave oven heating is preferred.

The container is preferably provided with a breathable portion from the viewpoint of deaeration and burst prevention. The breathable portion is more preferably provided on a top surface of the container because the deaeration can be thus eased. Examples of the shape of the breathable portion include a circle, an ellipse, a triangle, a rectangle, a polygon and a slit, but the shape is not especially limited as long as deaeration can be properly performed.

The frozen noodles obtained by the aforementioned method are thawed, as occasion demands, to be edible. Thawing means may be thawing at room temperature or slow thawing, but quick thawing with heating means such as a microwave oven, boiling, steam heating or an oven is preferred.

In the frozen noodles obtained by the aforementioned method, freezer burn during frozen storage can be prevented. More specifically, drying, thinning, surface discoloring or hardening of the noodles caused by evaporation or migration of water contained in a surface portion of the noodles to another portion during the frozen storage can be inhibited. Accordingly, even if the frozen noodles are frozen-stored for a long period of time, the appearance, the texture or the taste of the noodles is not degraded due to freezer burn, and in addition, the taste and flavor peculiar to the oil or fat is given to the noodles, and a good quality can be maintained.

EXAMPLES

Example 1

Preparation of Freezer Burn Inhibitor

Seven compositions (compositions 1 to 7) respectively having different viscosities were prepared by mixing oil or fat with a polysaccharide thickener, and further mixing the thus obtained mixture with water. The constituents and the viscosities of the respective compositions are shown in Table 1.

TABLE 1

| | Composition | | | | | | |
|---|---|---|---|---|---|---|---|
| | 1 | 2 | 3 | 4 | 5 | 6 | 7 |
| Constituents (mass %) | | | | | | | |
| Soybean oil | 21.9 | 23.1 | 33.2 | 33.2 | 33.7 | 33.1 | 32.9 |
| Polysaccharide thickener (tamarind gum) | 0.001 | 0.001 | 0.083 | 0.166 | 0.083 | 0.083 | 0.083 |
| Polysaccharide thickener (xanthan gum) | 0.050 | 0.166 | 0.166 | 0.332 | 0.420 | 0.916 | 1.050 |
| Water | balance (about 78) | balance (about 76) | balance (about 66) | balance (about 66) | balance (about 66) | balance (about 66) | balance (about 67) |
| Total | 100 | 100 | 100 | 100 | 100 | 100 | 100 |
| Viscosity of composition (mPa · s at 60° C.) | (Below measurement limit) | 30 | 80 | 230 | 1000 | 2000 | 2400 |

Example 2

Production of Frozen Noodles

Commercially available dried spaghetti (with a diameter of 1.7 mm, Select 1.7, manufactured by Ma-Ma Macaroni Co., Ltd.) was boiled for 7 minutes so as to attain a yield within a range of 220 to 235%, and then cooled to a food product temperature of 20° C. or less by exposure to cold water. To 200 g of the thus obtained cooked spaghetti, 22.2 g (i.e., 11% based on the mass of noodles) of each of the compositions 1 to 7 prepared in Example 1, which had been adjusted to a temperature of 20° C., was attached by spraying it onto the surface of noodle strands by using a spraying nozzle (manufactured by Spraying Systems Co.). During the spraying, substantially no drip occurred. The spaghetti to which each of the compositions had been sprayed was packed in a tray (with a length of 20 cm×a width of 15 cm×a height of 3 cm), and the resultant was quickly frozen at −20° C. to obtain frozen spaghetti. This frozen spaghetti was taken out of the container tray and put in a packing bag, and the packing bag was sealed (Production Examples 1 to 7).

Test Example 1

Each of the frozen noodles of Production Examples 1 to 7 was stored at −20° C. for 10 hours, was heat shocked at −2° C. for 2 hours, was subsequently stored at −20° C. for 10 hours again, and then was heat shocked at −2° C. for 2 hours again. Thereafter, the same series of operations were repeated 8 times. The resultant frozen spaghetti subjected to heat shock was evaluated for the degree of freezer burn in accordance with the following evaluation criteria to obtain an average of evaluation scores (N=10). The results are shown in Table 2. Besides, the texture of the spaghetti having been thawed for 3 minutes by a microwave oven at 500 W, and the easiness of mixing spaghetti with 100 g of a commercially available meat sauce (manufactured by Nisshin Foods Inc.) were evaluated in accordance with the following evaluation criteria to obtain an average of evaluation scores (N=10). The results are shown in Table 2.

[Evaluation Criteria]
Appearance (Evaluation criteria for freezer burn):
5: No change was caused in the thickness of noodles as compared with that before freezing.
4: The thickness of noodles was slightly thinned as compared with that before freezing.
3: The surface of noodles slightly dried, and the thickness of noodles was slightly thinned as compared with that before freezing.
2: The surface of noodles dried somewhat, and the thickness of noodles was thinned somewhat as compared with that before freezing.
1: The surface of noodles dried, and the thickness of noodles was considerably thinned as compared with that before freezing.

Texture:
5: The spaghetti sufficiently had its own taste and flavor and the taste and flavor of oil or fat, and substantially no change was caused in the texture as compared with that before freezing.
4: The spaghetti had its own taste and flavor and the taste and flavor of oil or fat, and its viscoelastic property was slightly reduced as compared with that before freezing.
3: The spaghetti had its own taste and flavor and the taste and flavor of oil or fat to some extent, its viscoelastic property was slightly reduced as compared with that before freezing, and it had crumbly texture.
2: The spaghetti slightly had its own taste and flavor and the taste and flavor of oil or fat, its viscoelastic property was reduced somewhat as compared with that before freezing, and it had crumbly texture.
1: The spaghetti had substantially none of its own taste and flavor and the taste and flavor of oil or fat, was considerably hard as compared with that before freezing, and had crumbly texture.

Evaluation of covering of noodles with sauce:
5: The noodles were very easily mixed with the sauce and were sufficiently covered with the sauce.
4: The noodles were easily mixed, but were slightly insufficiently covered with the sauce.
3: The noodles were slightly difficult to mix, and were slightly insufficiently covered with the sauce.
2: The noodles were rather difficult to mix, and were not covered with the sauce in some portions.
1: The noodles were considerably difficult to mix, and were not covered with the sauce in many portions.

TABLE 2

| Constituents of composition (mass %) | Production Example 1 | Production Example 2 | Production Example 3 | Production Example 4 | Production Example 5 | Production Example 6 | Production Example 7 |
|---|---|---|---|---|---|---|---|
| Soybean oil | 21.9 | 23.1 | 33.2 | 33.2 | 33.7 | 33.1 | 32.9 |
| Polysaccharide thickener (tamarind gum) | 0.001 | 0.001 | 0.083 | 0.166 | 0.083 | 0.083 | 0.083 |
| Polysaccharide thickener (xanthan gum) | 0.050 | 0.166 | 0.166 | 0.332 | 0.420 | 0.916 | 1.050 |
| Water | balance (about 78) | balance (about 76) | balance (about 66) | balance (about 66) | balance (about 66) | balance (about 66) | balance (about 67) |
| Total | 100 | 100 | 100 | 100 | 100 | 100 | 100 |
| Viscosity of composition (mPa·s at 60° C.) | Below measurement limit | 30 | 80 | 230 | 1000 | 2000 | 2400 |
| Amount of composition attached (% based on mass of noodles) | 11 | 11 | 11 | 11 | 11 | 11 | 11 |
| Evaluation | | | | | | | |
| Appearance | 1.8 | 3.8 | 4.1 | 4.8 | 4.1 | 3.8 | 2.8 |
| Texture | 2.2 | 4.1 | 4.2 | 4.8 | 3.8 | 3.7 | 2.5 |
| Covering with sauce | 2.3 | 4.3 | 4.5 | 4.8 | 4.0 | 3.9 | 2.2 |

Test Example 2

Compositions were prepared in the same manner as in Example 1 except that the content of water was changed as shown in Table 3. Frozen spaghetti was obtained by attaching 22.2 g (11% based on the mass of noodles) of each of these compositions to 200 g of cooked spaghetti in the same manner as in Example 2 (Production Examples 8 to 12). The thus obtained frozen spaghetti was evaluated for freezer burn in the same manner as in Test Example 1. The results are shown in Table 3.

TABLE 3

| | Production Example 8 | Production Example 9 | Production Example 10 | Production Example 11 | Production Example 12 |
|---|---|---|---|---|---|
| Constituents of composition (mass %) | | | | | |
| Soybean oil | balance (about 49) | balance (about 39) | balance (about 29) | balance (about 23) | balance (about 19) |
| Tamarind gum | 0.166 | 0.166 | 0.166 | 0.166 | 0.166 |
| Xanthan gum | 0.332 | 0.332 | 0.332 | 0.332 | 0.332 |
| Water | 50 | 60 | 70 | 76 | 80 |
| Total | 100 | 100 | 100 | 100 | 100 |
| Viscosity of composition (mPa·s at 60° C.) | 630 | 260 | 170 | 70 | 40 |
| Evaluation | | | | | |
| Appearance | 3.6 | 4.0 | 4.7 | 3.8 | 3.7 |
| Texture | 3.2 (*1) | 3.8 | 4.8 | 3.7 | 2.9 (*2) |
| Covering with sauce | 3.3 | 4.2 | 4.6 | 4.1 | 3.5 |

(*1) The amount of oil was too large and the texture was sticky.
(*2) The taste and flavor peculiar to oil or fat was lost.

Test Example 3

Frozen spaghetti was obtained by attaching the composition 4 prepared in Example 1 in each amount shown in Table 4 to 200 g of cooked spaghetti in the same manner as in Example 2 (Production Examples 13 to 19). The thus obtained frozen spaghetti was evaluated for freezer burn in the same manner as in Test Example 1. The results are shown in Table 4. Incidentally, the frozen spaghetti of Production Example 19 could not be partly thawed by the microwave oven heating for 3 minutes, and hence, was additionally heated by the microwave oven heating for further 20 seconds.

TABLE 4

| | Production Example 13 | Production Example 14 | Production Example 15 | Production Example 16 | Production Example 17 | Production Example 18 | Production Example 19 |
|---|---|---|---|---|---|---|---|
| Amount of composition attached (% based on mass of noodles) | 0.5 | 1 | 3 | 5 | 10 | 15 | 18 |

TABLE 4-continued

| | Production Example 13 | Production Example 14 | Production Example 15 | Production Example 16 | Production Example 17 | Production Example 18 | Production Example 19 |
|---|---|---|---|---|---|---|---|
| Evaluation | | | | | | | |
| Appearance | 1.7 | 3.5 | 3.6 | 4.4 | 4.7 | 4.2 | 3.8 |
| Texture | 1.8 | 3.7 | 3.8 | 4.6 | 4.6 | 3.3 | 2.2 (*1) |
| Covering with sauce | 2.7 | 3.4 | 4.0 | 4.8 | 4.3 | 3.0 | 2.1 |

(*1) The oily feeling was enhanced and the texture was sticky.

Test Example 4

A composition was prepared by mixing oil or fat with a polysaccharide thickener, and further mixing the thus obtained mixed liquid with water, or further with common salt. The constituents and the viscosity of the composition are shown in Table 5. Frozen spaghetti was obtained by attaching the thus obtained composition (22.2 g: 11% based on the mass of noodles) to 200 g of cooked spaghetti in the same manner as in Example 2 (Production Example 20). The thus obtained frozen spaghetti was evaluated for freezer burn in the same manner as in Test Example 1. The results are shown in Table 5. It is noted that the results of Production Example 4 are also shown in Table 5.

TABLE 5

| | Production Example 4 | Production Example 20 |
|---|---|---|
| Constituents of composition (mass %) | | |
| Soybean oil | 33.2 | 33.2 |
| Tamarind gum | 0.166 | 0.166 |
| Xanthan gum | 0.332 | 0.332 |
| Common salt | — | 3.0 |
| Water | balance (about 66) | balance (about 63) |
| Total | 100 | 100 |
| Viscosity of composition (mPa · s at 60° C.) | 220 | 260 |
| Evaluation | | |
| Appearance | 4.8 | 4.2 |
| Texture | 4.8 | 3.9 |
| Covering with sauce | 4.8 | 2.5 |

Test Example 5

Compositions were prepared in the same manner as in Example 1 except that the food product temperature of each composition in attaching the composition to cooked spaghetti was changed as shown in Table 6. The thus obtained frozen spaghetti was evaluated for freezer burn in the same manner as in Test Example 1. The results are shown in Table 6. It is noted that the results of Production Example 3 are also shown in Table 6.

TABLE 6

| | Production Example 21 | Production Example 22 | Production Example 3 | Production Example 23 | Production Example 24 | Production Example 25 | Production Example 26 |
|---|---|---|---|---|---|---|---|
| Constituents of composition (mass %) | | | | | | | |
| Soybean oil | 33.2 | 33.2 | 33.2 | 33.2 | 33.2 | 33.2 | 33.2 |
| Polysaccharide thickener (tamarind gum) | 0.083 | 0.083 | 0.083 | 0.083 | 0.083 | 0.083 | 0.083 |
| Polysaccharide thickener (xanthan gum) | 0.166 | 0.166 | 0.166 | 0.166 | 0.166 | 0.166 | 0.166 |
| Water | balance (about 66) | balance (about 66) | balance (about 66) | balance (about 66) | balance (about 66) | balance (about 66) | balance (about 66) |
| Total | 100 | 100 | 100 | 100 | 100 | 100 | 100 |
| Viscosity of composition (mPa · s at 60° C.) | 80 | 80 | 80 | 80 | 80 | 80 | 80 |
| Amount of composition attached (% based on mass of noodles) | 11 | 11 | 11 | 11 | 11 | 11 | 11 |
| Food product temperature of composition (° C.) | 12 | 15 | 20 | 30 | 45 | 60 | 65 |
| Evaluation | | | | | | | |
| Appearance | 3.5 | 4.0 | 4.1 | 4.2 | 4.1 | 3.9 | 3.2 |
| Texture | 3.8 | 4.0 | 4.2 | 4.5 | 4.3 | 3.8 | 3.1 |
| Covering with sauce | 3.6 | 4.3 | 4.5 | 4.7 | 4.3 | 4.0 | 2.9 |

The invention claimed is:

1. A method, comprising:
    attaching a composition to cooked noodles, the composition comprising water, oil or fat, and a polysaccharide thickener, the composition having a viscosity of from 30 to 2000 mPa·s at 60° C.; and
    freezing the cooked noodles to which the composition has attached,
    wherein the composition is attached to the cooked noodles in an amount of from 1 to 15% by mass based on a mass of the cooked noodles, the composition comprises no common salt, and the temperature of said composition during said attaching is from 20 to 45° C.

2. The method according to claim 1, wherein the composition is attached to the cooked noodles in an amount of from 5 to 10% by mass based on a mass of the cooked noodles.

3. The method according to claim 1, wherein a content of the polysaccharide thickener in the composition is from 0.1 to 1.0% by mass.

4. The method according to claim 1, wherein a content of the oil or fat in the composition is from 23 to 39.9% by mass.

5. The method according to claim 1, wherein a content of the water in the composition is from 60 to 76.9% by mass.

6. The method according to claim 1, wherein the cooked noodles are at a food product temperature of 20° C. or less, when the composition is attached to the cooked noodles.

7. The method according to claim 1, wherein a content of the polysaccharide thickener in the composition is from 0.1 to 1.0% by mass, a content of the oil or fat in the composition is from 23 to 39.9% by mass, and a content of the water in the composition is from 60 to 76.9% by mass.

8. The method according to claim 7, wherein the cooked noodles are at a food product temperature of 20° C. or less, when the composition is attached to the cooked noodles.

9. The method according to claim 7, wherein the oil or fat is at least one of soybean oil and margarine, and the polysaccharide thickener is at least one of xanthan gum and tamarind gum.

10. The method according to claim 8, wherein the composition is attached to the cooked noodles in an amount of from 5 to 10% by mass based on a mass of the cooked noodles.

11. The method according to claim 10, wherein the viscosity of the composition is from 80 to 1000 mPa·s at 60° C.

12. The method according to claim 1, wherein the viscosity of the composition is from 80 to 1000 mPa·s at 60° C.

13. The method according to claim 1, wherein a content of the polysaccharide thickener in the composition is from 0.3 to 0.7% by mass, a content of the oil or fat in the composition is from 27 to 36% by mass, and a content of the water in the composition is from 65 to 72% by mass.

14. The method according to claim 13, wherein the cooked noodles are at a food product temperature of 20° C. or less, when the composition is attached to the cooked noodles.

15. The method according to claim 14, wherein the composition is attached to the cooked noodles in an amount of from 5 to 10% by mass based on a mass of the cooked noodles.

16. The method according to claim 15, wherein the viscosity of the composition is from 80 to 1000 mPa·s at 60° C.

17. The method according to claim 15, wherein the oil or fat is at least one of soybean oil and margarine, and the polysaccharide thickener is at least one of xanthan gum and tamarind gum.

18. The method according to claim 1, wherein said attaching provides said noodles with protection from freezer burn.

19. The method according to claim 1, wherein the oil or fat is at least one of soybean oil and margarine, and the polysaccharide thickener is at least one of xanthan gum and tamarind gum.

20. A method, comprising:
    attaching a composition to cooked noodles, the composition comprising water, oil or fat, and a polysaccharide thickener, the composition having a viscosity of from 30 to 2000 mPa·s at 60° C.; and
    freezing the cooked noodles to which the composition has attached,
    wherein the composition is attached to the cooked noodles in an amount of from 1 to 15% by mass based on a mass of the cooked noodles, the composition comprises no common salt, and the temperature of said composition during said attaching is from 20 to 45° C.,
    wherein a content of the polysaccharide thickener in the composition is from 0.3 to 0.7% by mass, a content of the oil or fat in the composition is from 27 to 36% by mass, and a content of the water in the composition is from 65 to 72% by mass, and
    wherein the oil or fat is at least one of soybean oil and margarine, and the polysaccharide thickener is at least one of xanthan gum and tamarind gum.

* * * * *